US012689152B2

(12) United States Patent
Shindo

(10) Patent No.: US 12,689,152 B2
(45) Date of Patent: Jul. 21, 2026

(54) SEAL MEMBER AND CONNECTOR ASSEMBLY

(71) Applicant: Tyco Electronics Japan G.K., Kawasaki (JP)

(72) Inventor: Yoshihiko Shindo, Shizuoka (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 280 days.

(21) Appl. No.: 18/480,556

(22) Filed: Oct. 4, 2023

(65) Prior Publication Data

US 2024/0113471 A1 Apr. 4, 2024

(30) Foreign Application Priority Data

Oct. 4, 2022 (JP) ................................. 2022-160369

(51) Int. Cl.
H01R 13/52 (2006.01)
F16J 15/02 (2006.01)

(52) U.S. Cl.
CPC ........ H01R 13/5219 (2013.01); F16J 15/025 (2013.01)

(58) Field of Classification Search
CPC ............................ F16J 15/025; H01R 13/5219
USPC ......................................................... 439/271
See application file for complete search history.

(56) References Cited

U.S. PATENT DOCUMENTS 3,937,478 A * 2/1976 Mancebo ............. F16J 15/0881
277/913
4,944,688 A * 7/1990 Lundergan ........... H01R 13/443
439/752
5,100,335 A * 3/1992 Yamamoto ......... H01R 13/5219
439/271
5,713,761 A * 2/1998 Okayasu ............ H01R 13/5219
439/732
5,782,658 A * 7/1998 Maegawa .......... H01R 13/5219
439/271
6,045,383 A * 4/2000 Fujiwara ............ H01R 13/5219
439/271
6,244,886 B1 * 6/2001 Strang ................ H01R 13/5202
439/271
6,409,552 B2 * 6/2002 Matsumoto ........ H01R 13/4362
439/271

(Continued)

FOREIGN PATENT DOCUMENTS

EP 3629426 A1 4/2020
JP H09306585 A 11/1997

(Continued)

OTHER PUBLICATIONS

Extended European Search Report dated Feb. 14, 2024, corresponding to Application No. 23201268.2-1015, 9 pages.

*Primary Examiner* — Tulsidas C Patel
*Assistant Examiner* — Thomas K Quigley

(57) ABSTRACT

A sealing element comprises a raised region. The raised region includes a plurality of first ridges on a first principal face, a plurality of second ridges on a second principal face opposite to the first principal face, and a central trough. The central trough is formed between the adjacent ones of the second ridges and is located in a center of the second principal face. At least one of the first ridges located in the most outer side of the plurality of first ridges is positioned offset in a width direction relative to the plurality of second ridges.

20 Claims, 9 Drawing Sheets

(56) References Cited

U.S. PATENT DOCUMENTS

| | | | | |
|---|---|---|---|---|
| 6,494,731 | B1 * | 12/2002 | Suzuki | H01R 13/5208 |
| | | | | 439/71 |
| 6,994,590 | B2 * | 2/2006 | Nishida | H01R 13/5219 |
| | | | | 439/271 |
| 7,926,819 | B2 * | 4/2011 | Reinhart | F16J 15/121 |
| | | | | 277/637 |
| 7,976,028 | B2 * | 7/2011 | Miyoshi | F16J 15/122 |
| | | | | 277/654 |
| 8,317,530 | B2 * | 11/2012 | Sawairi | H01R 13/5219 |
| | | | | 439/271 |
| 9,337,571 | B2 * | 5/2016 | Furuya | H01R 13/5219 |
| 11,894,633 | B2 * | 2/2024 | Ikeya | H01R 13/5219 |
| 12,152,491 | B1 * | 11/2024 | Ivakitch | F16J 15/064 |
| 2001/0041470 | A1 | 11/2001 | Makita | |
| 2002/0001987 | A1 * | 1/2002 | Murakami | H01R 13/5219 |
| | | | | 439/271 |
| 2005/0179209 | A1 | 8/2005 | Kobayashi | |
| 2009/0035976 | A1 * | 2/2009 | Matsunaga | H01R 13/5219 |
| | | | | 439/271 |
| 2013/0183844 | A1 * | 7/2013 | Wang | H01R 24/68 |
| | | | | 439/271 |
| 2014/0213088 | A1 * | 7/2014 | Furuya | H01R 13/5219 |
| | | | | 439/271 |
| 2018/0076561 | A1 * | 3/2018 | Aoshima | H01R 13/40 |
| 2019/0067869 | A1 * | 2/2019 | Hirota | H01R 13/5208 |
| 2020/0106209 | A1 * | 4/2020 | Takahashi | H01R 13/5205 |
| 2021/0033193 | A1 * | 2/2021 | Aoki | F16J 15/062 |
| 2023/0054933 | A1 * | 2/2023 | Yonezu | H01R 13/516 |
| 2023/0170643 | A1 * | 6/2023 | Demaratos | F16J 15/025 |
| | | | | 439/271 |
| 2024/0120670 | A1 * | 4/2024 | Vasbinder | H01B 7/28 |
| 2025/0149822 | A1 * | 5/2025 | Nakai | H01R 13/5219 |
| 2025/0167478 | A1 * | 5/2025 | Kataoka | H01R 13/64 |

FOREIGN PATENT DOCUMENTS

| | | | |
|---|---|---|---|
| WO | 9743803 | A1 | 11/1997 |
| WO | 2015060025 | A1 | 4/2015 |

* cited by examiner

SEAL MEMBER AND CONNECTOR ASSEMBLY

CROSS-REFERENCE TO RELATED APPLICATION

This application claims the benefit of Japanese Patent Application No. 2022-160369, filed Oct. 4, 2022, the whole disclosure of which is incorporated herein by reference.

FIELD OF THE INVENTION

The present disclosure relates to a sealing element. In particular, the present disclosure relates to a sealing element included in a connector.

BACKGROUND

According to the prior art, two mated connectors may utilize a sealing element arranged therebetween in order to inhibit liquid or the like from entering the interiors of the connectors. For example, a sealing element of the prior art has a generally frame shape. Three streaks arranged in lines along a circumferential direction are disposed on each of the outer and inner peripheral sides of the sealing element. Sets of the streaks or ribs disposed on the inner and outer peripheral sides are configured to abut on the housings of the two connectors, respectively. In such a configuration, the streaks of the sealing element are pressed between the housings of the connectors to strongly come into contact with the housings, while being elastically deformed, to achieve sealing between the housings.

In a sealing element having such a structure, in particular, the streak located in the center of three streaks can be compressed and deformed so as to be destroyed by loads from two housings facing each other. However, the width dimension between the housings can be decreased to increase a compressive load applied to the sealing element depending on a dimensional tolerance between connectors. In such a case, the repulsive force of the sealing element can be excessively increased by more strongly pressing the streak in the center of the sealing element to greatly deform the streak. Such an increase in repulsive force allows a large introduction force to be required in an operation of mating the connector and may cause the sealing element or the connector to be broken.

Accordingly, there is a need for a sealing element that realizes a decrease in force required in an operation of mating a connector.

SUMMARY

According to an embodiment of the present disclosure, a sealing element comprises a raised region. The raised region includes a plurality of first ridges on a first principal face, a plurality of second ridges on a second principal face opposite to the first principal face, and a central trough. The central trough is formed between the adjacent ones of the second ridges and is located in a center of the second principal face. At least one of the first ridges located in the most outer side of the plurality of first ridges is positioned offset in a width direction relative to the plurality of second ridges.

BRIEF DESCRIPTION OF THE DRAWINGS

The invention will now be described by way of example with reference to the accompanying Figures, of which.

DETAILED DESCRIPTION OF THE EMBODIMENTS

Figure 1:
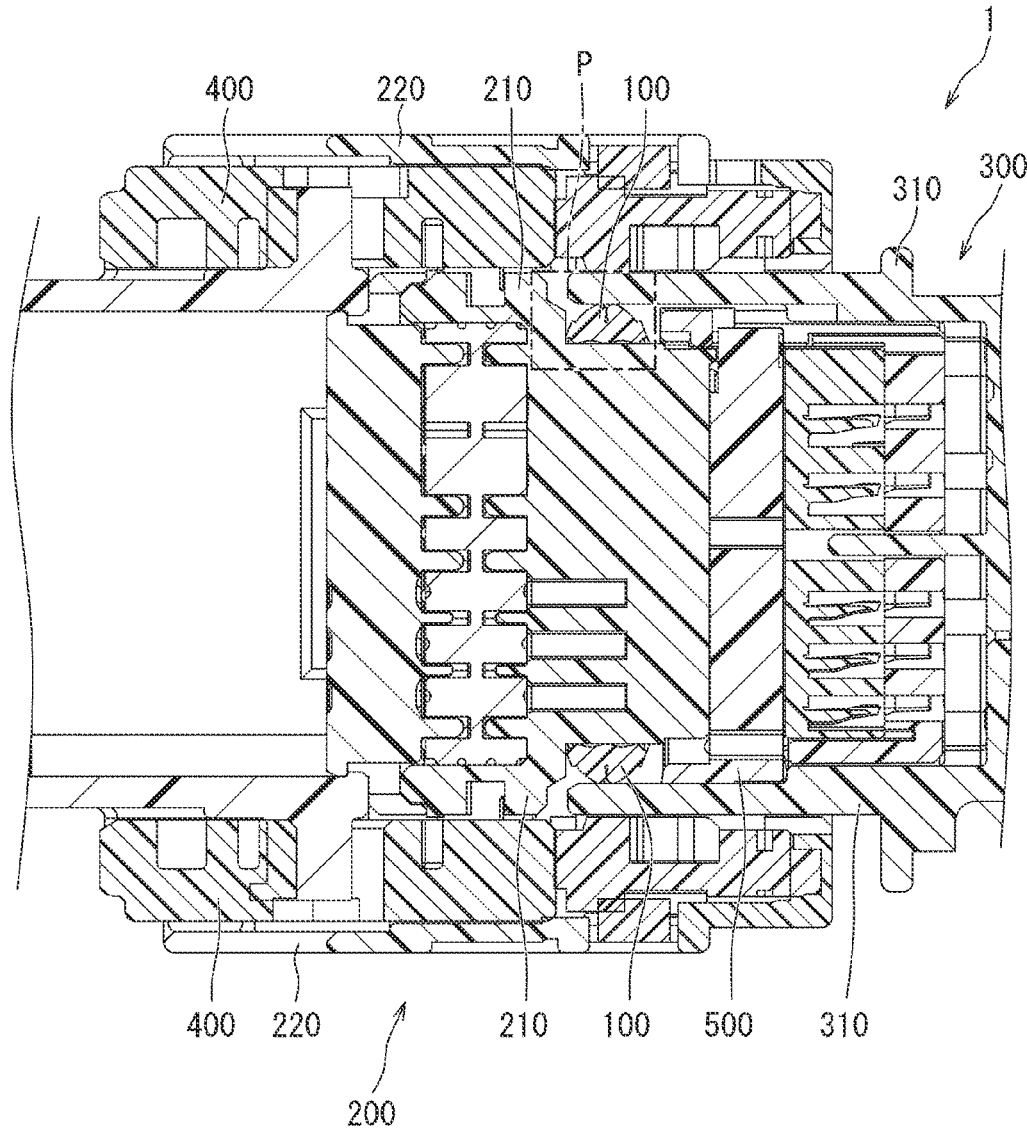
FIG. 1 is a cross sectional view schematically illustrating: a first connector including a sealing element of the present disclosure; and a second connector that matches with the first connector.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A sealing element according to one embodiment of the present disclosure is described in more detail below with reference to the drawings. Various elements in the drawings are just described in a schematical and exemplary manner for explaining the present disclosure, and the appearances and dimensional ratios of the elements can be different from those of real things.

A sealing element according to one embodiment of the present disclosure is described in more detail below with reference to the drawings. Various elements in the drawings are just described in a schematical and exemplary manner for explaining the present disclosure, and the appearances and dimensional ratios of the elements can be different from those of real things.

In the following explanation, terms meaning specific directions and positions are further used, as necessary. However, the terms are used for facilitating understanding of the invention with reference to the drawings, and the technical scope of the present disclosure is not restricted by the meanings of the terms. Moreover, portions denoted by the same reference characters in the plurality of drawings refer to the same or similar portions.

Moreover, the explanation of the exemplified aspects of the present disclosure is intended to be read in relation to the accompanying drawings (the drawings considered to be part of the whole described explanation). In the explanation related to the aspects of the present disclosure disclosed herein, reference to a direction or an orientation is merely for convenience in the explanation and is not intended to limit the scope of the present disclosure. Relative terms such as "upper", "lower", "horizontal", "perpendicular", "above", "below", "top", and "bottom", derivation terms thereof, "horizontally", "upward", "downward", and the like should be understood to refer to directions as described or illustrated. In such a relative term, which is only for convenience in the explanation, an apparatus need not be configured or operated in a specific direction unless otherwise specified. Moreover, a term such as "attached", "added", or "assembled", or a term similar thereto refers to a relationship in which structures are directly or indirectly fixed or attached to each other with an inclusion, attachment of both the structures which are movable or rigid, or the relationship thereof unless otherwise specified. Further, examples of the features or advantages of the present disclosure are described with reference to preferred aspects. Such aspects are sufficiently described in detail and enable those skilled in the art to carry out the present disclosure. It should be understood that other aspects can also be used, and processes and electrical or mechanical modifications are enabled without departing from the scope of the present disclosure. Accordingly, the present disclosure is not definitely limited to preferred aspects (aspects combined with single or other features) describing examples of unrestricted combinations of conceivable features.

The term "generally perpendicular" as used herein need not mean completely "perpendicular" and encompasses aspects of slight deviations therefrom (for example, a deviation from completely "perpendicular" is in a range of $90°±20°$, for example, in a range of $90°±10°$). The term "generally parallel" as used herein need not mean "completely parallel" and encompasses aspects of slight deviations therefrom (for example, a deviation from "completely parallel" is in a range of $±20°$, for example, in a range of up to $±10°$). Further, "viewed in cross section" as used herein means a cross section taken along a direction orthogonal to the longitudinal direction of a sealing element (that is, the lateral direction of the sealing element).

[Basic Configuration of a Connector Assembly Including a Sealing Element of Present Disclosure]

Embodiments of the present disclosure relate to a structure of a sealing element applicable for sealing a gap between two elements. First, a general description of an exemplary connector assembly to which the sealing element of the present disclosure can be applied is given below with reference to the drawings in order to recognize the structure of the sealing element of the present disclosure.

FIG. 1 is a cross sectional view schematically illustrating the connector assembly including the sealing element of the present disclosure. A connector assembly 1 includes a first connector 200, a second connector 300 that matches with the first connector, and a sealing element 100 that is placed between the first connector and the second connector. In the present disclosure, "assembly" corresponds to a composite article, a matching article, or the like including a plurality of components.

The first connector 200 includes an outer housing 220, and an inner housing 210 that is housed in the outer housing. Each of the outer housing 220 and the inner housing 210 opens in the direction of mating with the second connector 300. A contact (not illustrated) that can be electrically connected to a contact of the second connector 300 may be supported by the inner housing 210. The inner housing 210 may include a space around the inner housing 210, between the inner housing and the outer housing 220. The first connector 200 and the second connector 300 may be mated with each other by introducing the housing 310 of the second connector into such a space.

The sealing element 100 of the present disclosure can be disposed between the first connector 200 and the second connector 300 in a state in which the first connector and the second connector are mated with each other. More specifically, the sealing element 100 of the present disclosure can be placed between the inner housing 210 of the first connector 200 and the housing 310 of the second connector 300 in the mating state to waterproof the contacts in the connectors.

The sealing element 100 may be attached to surround the outer periphery of the inner housing 210 of the first connector 200. For example, a groove may be formed around the outer side of the inner housing 210, and the sealing element 100 may be fitted into the groove. The sealing element 100 abuts on the housing 310 of the second connector 300 in a state in which the second connector is introduced into the first connector 200. In such a state, the sealing element 100 is brought into intimate or abutting contact with both of the outer face of the inner housing 210 of the first connector 200 and the inner face of the housing 310 of the second connector 300. This achieves a seal between the first connector 200 and the second connector 300.

Figure 2:
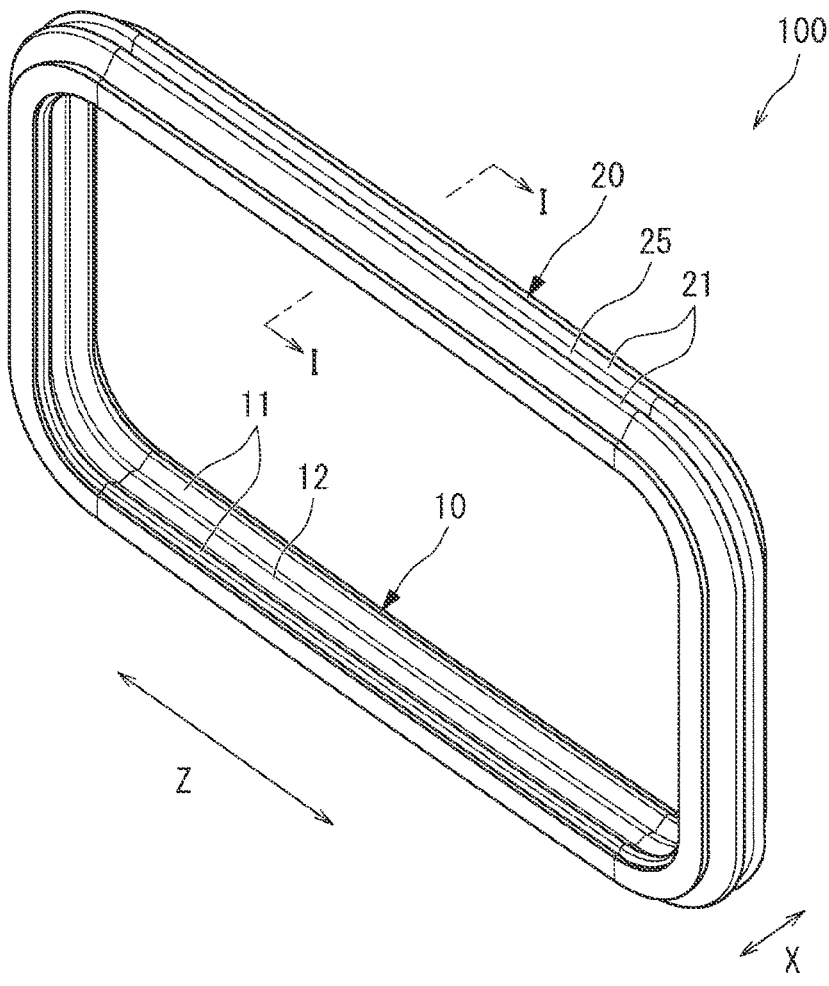
FIG. 2 is an isometric view schematically illustrating the sealing element of the present disclosure.

FIG. 2 is an isometric view schematically illustrating the sealing element 100 of the present disclosure. The sealing element 100 may have a ring or frame shape in which the sealing element can be brought into close contact with the outer periphery of the inner housing 210 of the first connector 200. Alternatively, the sealing element 100 may have another shape such as a long-length shape, a generally C-shape, or a generally U-shape. The sealing element 100 may be integrally molded by, for example, injection molding, using an elastic material (for example, silicon rubber). In the mating state, the sealing element 100 can achieve sealing between the first connector 200 and the second connector 300 in a fluid-tight manner by elastically deforming the sealing element by pressing the sealing element with the first connector and the second connector.

Features of a Sealing Element of Present Disclosure

A feature of the present disclosure is the structure of the sealing element 100 applicable to such a connector as described above. The structure of the sealing element 100 of the present disclosure is described in detail below based on, as a presupposition, an aspect applied between the first connector 200 and the second connector 300 as described above.

Figure 3:
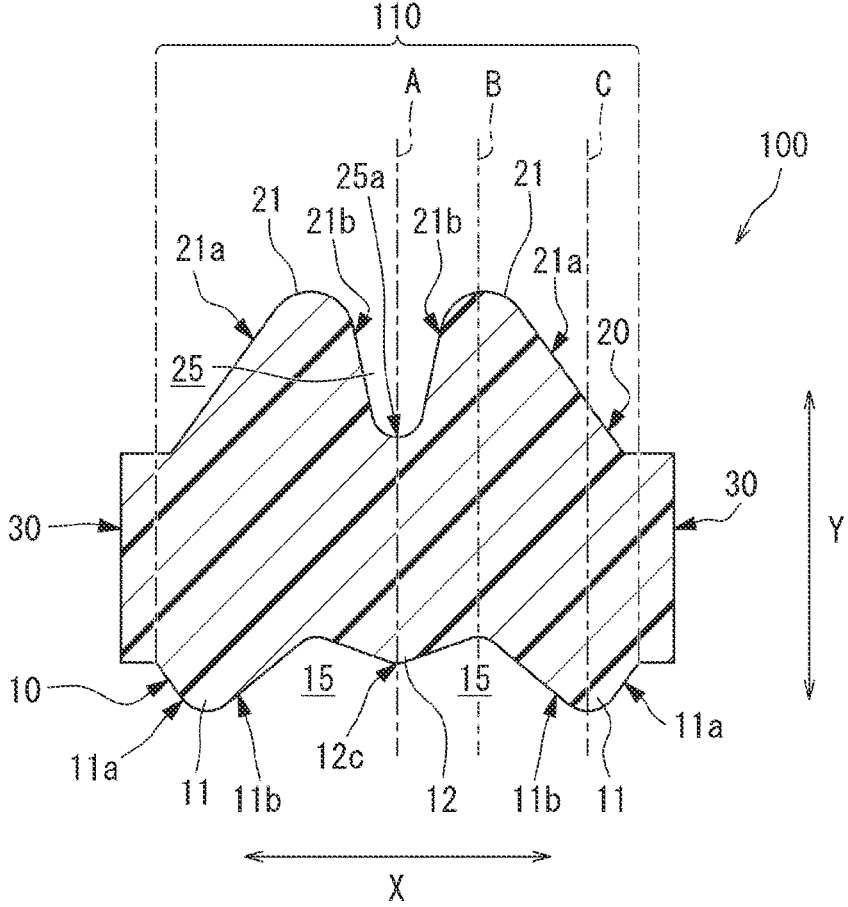
FIG. 3 is a cross sectional view schematically illustrating a cross section of the sealing element, taken along the line I-I of FIG. 1.

FIG. 3 is a cross sectional view schematically illustrating a cross section of the sealing element 100 of the present disclosure, taken along the line I-I illustrated in FIG. 2. As illustrated in FIGS. 1 to 3, the sealing element 100 of the present disclosure can be attached between the first connector 200 and the second connector 300 that match with each other. The sealing element 100 includes a raised region 110 including a plurality of ridges on two principal faces, reverse to each other, respectively. As used herein, "raised region" refers to, in a broad sense, a region including ridges in the sealing element 100, and means, a region including a plurality of ridges on two principal faces, opposite to each other, in the region sealing element, respectively. Specifically, "raised region" is a region including ridges raised toward the first connector and ridges raised toward the second connector and can be referred to as "ridge-containing region" and the like.

The raised region 110 includes a first principal face 10 facing the first connector 200 and a second principal face 20 facing the second connector 300 that matches with the first connector. Before the second connector 300 is introduced into the first connector 200, the sealing element 100 can be attached to the first connector so that the first principal face 10 faces the first connector. In other words, "first principal face" as used herein means a face of the raised region 110, facing the first connector 200 to which the sealing element 100 is attached before the first connector and the second connector 300 are mated with each other. As used herein, "second principal face" means a face of the raised region 110, facing the second connector 300 in a state in which the second connector is introduced into the first connector 200, and corresponds to a face located on the reverse side of the first principal face 10. The first/second principal face 10, 20 is a face located in the direction of a load imposed on the sealing element 100 (that is, the thickness direction Y of the sealing element 100), and each face includes a portion that abuts on or comes into contact with the first connector 100 or the second connector 200 and can thus also be referred to as "first/second abutment face", or "first/second contact face" or "first/second face to be pressed".

The sealing element 100 preferably has a ring or frame shape in a case in which the sealing element 100 is disposed on the entire peripheries of the housings of the connectors. In light of such a shape, the first principal face 10 corresponds to the principal face of the inner peripheral side of the sealing element 100 and can thus also be regarded as the inner peripheral principal face of the sealing element 100. The second principal face 20 corresponds to the principal face of the outer peripheral side of the sealing element and can thus also be regarded as the outer peripheral principal face of the sealing element.

As illustrated in FIGS. 2 and 3, the sealing element 100 includes the plurality of ridges located on both the first principal face 10 and the second principal face 20 in the raised region 110. Specifically, the sealing element 100 of the present disclosure includes a plurality of first ridges 11 present on the first principal face 10 facing the first connector 200 and a plurality of second ridges 21 present on the second principal face 20 facing the second connector 300 in the raised region 110. In other words, the plurality of first ridges 11 and the plurality of second ridges 21 are positioned in the raised region 110. As used herein, "plurality of" means two or more. A description is given below with reference to the drawings, based on, as a presupposition, an exemplary aspect in which three ridges 11, 12 are included on the first principal face 10 and two second ridges 21 are included on the second principal face 20.

On the first principal face 10 and the second principal face 20 in the raised region 110, the plurality of first ridges 11 and the plurality of second ridges 21 may be raised toward the first connector 200 and the second connector 300, respectively, to extend in the longitudinal direction Z of the sealing element 100 (see FIG. 2). Specifically, the first ridges 11 located on the first principal face 10 may be raised toward the first connector 200 to extend along the longitudinal direction Z of the sealing element 100. The second ridges 21 located on the second principal face 20 may be raised toward the second connector 200 to extend along the longitudinal direction Z of the sealing element 100 in a manner similar to that of the first ridges 11.

When the sealing element 100 has a ring or generally frame shape as illustrated in FIG. 2, "longitudinal direction" of the sealing element can also be regarded as "circumferential direction" of the sealing element. Accordingly, the first ridges 11 may extend along the inner periphery of the sealing element 100, and the second ridges 21 may extend along the outer periphery of the sealing element. As illustrated in FIG. 1, the first ridges 11 and the second ridges 21 come into intimate contact with the first connector 200 and the second connector 300, respectively, to contribute to sealing between the connectors, and can thus also be referred to as first lips and second lips.

The plurality of first ridges 11 may be arranged in lines in the lateral direction X of the sealing element 100, orthogonal to the longitudinal Z of the sealing element, on the first principal face 10. Likewise, the plurality of second ridges 21 may be arranged in lines in the lateral direction X of the sealing element 100 on the second principal face 20. Herein, the lateral direction X of the sealing element 100 is a direction corresponding to the width direction of the sealing element and can also be regarded as the width direction of the raised region 110. Each of the first ridges 11 and the second ridges 21 may be raised at a similar height in the longitudinal Z of the sealing element 100. In other words, cross sectional shapes of the sealing element 100 may be generally similar shapes in the longitudinal direction Z of the sealing element.

As illustrated in FIG. 3, a central trough 25 is formed in the center of the second principal face 20, viewed in a cross section. As used herein, "center" means the center of the length of the raised region 110 in the width direction X. In other words, "center of second principal face" means the center of the width dimension of the second principal face 20. Herein, a center is not necessarily an exact center. Although the center can deviate depending on the size of the sealing element, for example, a deviation of around 2 mm from the exact center can be permitted. The central trough 25 may be formed between two second ridges 21 adjacent to each other on the second principal face 20. In other words, the two second ridges 21 adjacent to each other across the center of the second principal face may be raised to form the central trough 25 in the center of the second principal face 20.

At least the first ridge 11 located in the most outer side of the plurality of first ridges is positioned to be offset against the second ridges 21, viewed in a cross section. As used herein, "outer side" means a positional relationship based on, for example, the position of a central ridge 12 described below, in the width direction X of the raised region 110, and specifically means an end side of the raised region. Such "outer side" can also be regarded as an edge side of the sealing element 100, for example, in a case in which the whole of the sealing element includes the raised region 110 as illustrated in FIG. 3. In other words, "first ridge located in most outer side" corresponds to a ridge located in the most end side of the first principal face 10, viewed in a cross section.

The first ridges 11 located in both the most outer sides of the first principal face 10 may be located in more outer sides than the second ridges 21, viewed in a cross section. In other words, the second ridges 21 located in the most outer sides of the plurality of second ridges are positioned at positions deviating toward more inner sides of the raised region 110 than the first ridges 11 located in the most outer sides of the plurality of first ridges, viewed in a cross section. In other words, the first ridges 11 and the second ridges 21 are not positioned on the same line in the thickness direction Y of the sealing element. For example, as illustrated in FIG. 3, imaginary lines C that pass through the vertexes of the first ridges 11 in the more outer sides and are parallel to the thickness direction Y are offset outward with respect to imaginary lines B that pass through the vertexes of the second ridges 21 and are parallel to the thickness direction Y. As used herein, "thickness direction of sealing element" refers to a direction that is parallel to a cross section of the sealing element 100 as illustrated in FIG. 3 and orthogonal to the width direction X of the sealing element (that is, a direction corresponding to a vertical direction in FIG. 3).

Figure 5A:
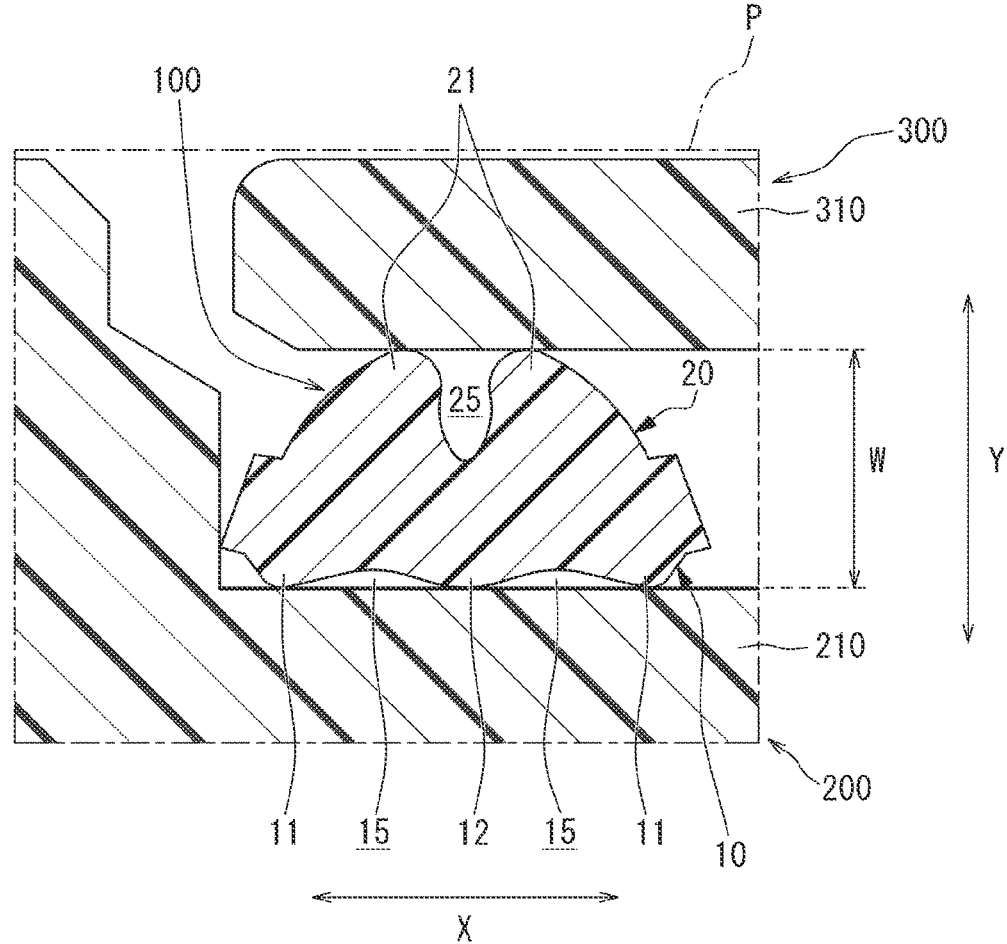
FIG. 5A is a cross section enlarged view schematically illustrating a sealing element located between a first connector and a second connector.

FIG. 5A is a cross sectional view schematically illustrating the sealing element of the present disclosure in a state in which a compressive load is applied to the sealing element. Further, as illustrated, in the sealing element of the present disclosure, including the structure described above, the second ridges 21 are pressed by the second connector 300 when the second connector is introduced into the first connector 200. A load imposed in the thickness direction Y of the sealing element 100 is applied to the sealing element placed between the connectors. In such a case, the second principal face 20 includes the central trough 25, and, in addition, the first ridges 11 are placed to be offset outward with respect to the second ridges 21, whereby the second ridges can be elastically deformed to be bent toward the central trough of the second principal face.

Specifically, portions just under the second ridges 21 (that is, positions on imaginary lines B parallel to the thickness direction Y) do not abut on the first connector 100 but abut on the first ridges 11 at positions offset in the width direction X because the first ridges and the second ridges are not located on the same axis with respect to the thickness direction Y, and the first ridges 11 are positioned to deviate relatively outward. Therefore, when a compressive load is imposed on the second ridges 21, the second ridges are compressed and deformed in a direction equivalent to the thickness direction Y, and the first ridges 11 located in an outer side, viewed in a cross section, can be bent to lean toward the outer side. Further, the second ridges 21 can be deformed to lean toward the central trough 25 by bending the first ridges 11.

In such an elastic deformation state, at least the first ridges 11 and the second ridges 21 come into contact with the first connector 200 and second connector 300, respectively, whereby waterproofness between the connectors can be secured. The second ridges 21 are deformed to lean toward the central trough 25, to thereby facilitate elastic deformation of the raised region 110 in the width direction X in the case of applying a compressive load. Such elastic deformation in the width direction X causes a relative decrease in the heights of the second ridges 21, viewed in a cross section, and therefore allows a reduction in the whole thickness of the sealing element 100 in the raised region 110. Therefore, the degree of the elastic deformation of the sealing element 100 in the thickness direction Y can be further reduced.

In other words, in accordance with the sealing element 100 of the present disclosure, elastic deformation of the sealing element in the width direction X in the raised region 110 is enabled, whereby the degree of elastic deformation in the thickness direction Y can be reduced to further decrease repulsive force acting in the thickness direction Y of the sealing element. As a result, excessive repulsive force acting on the first connector 200 and/or the second connector 300 from the sealing element 100 (that is, acting in the thickness direction Y of the sealing element) can be suppressed to reduce force required in introduction of the second connector. Accordingly, force for introducing a connector can be more preferably reduced in accordance with the sealing element 100 of the present disclosure.

Further, in accordance with the sealing element 100 of the present disclosure, the center of the second principal face 20 of the raised region 110 includes the central trough 25, whereby excessive repulsive force acting in the thickness direction Y of the sealing element can be more preferably suppressed. More specifically, the central trough 25 of the second principal face 20 can help the plurality of second ridges 21, located on the second principal face 20, to be preferably elastically deformed to be bent toward the center. In a conventional structure including a ridge in the center of a second principal face 20, the central ridge is elastically deformed to be compressed in a thickness direction Y without bending the central ridge when a load is applied in the thickness direction Y. Therefore, repulsive force acting in the thickness direction Y is further increased, and more force can be required in introduction of a connector. However, the sealing element 100 of the present disclosure has the structure in which the center of the second principal face 20 includes the central trough 25, whereby the leading ends of the second ridges 21 located on both the sides of the central trough can be bent toward the central trough to approach each other. In other words, the sealing element 100 of the present disclosure can be elastically deformed not only in the thickness direction Y but also in the width direction X when a compressive load is applied to the raised region 110, and therefore, excessive repulsive force acting in the thickness direction Y of the sealing element can be more preferably suppressed.

The cross-sectional shape of the central trough 25 is not particularly limited as long as such bending of the second ridges 21 as described above is achieved. For example, the cross-sectional shape may be a generally V-shape in which the central trough 25 is tapered down toward the bottom of the central trough so that the width dimension of the central trough is gradually reduced. In the second ridges 21 adjacent to each other across the central trough 25, such a cross sectional shape allows the tip portions of the second ridges to be preferably separated in a state in which a load is not applied to the second ridges (that is, in which the second connector 300 is not introduced). In a case in which the tip portions are insufficiently separated, sufficient bending of the second ridges 21 toward the center in application of a load becomes impossible, and the elastic deformation in the width direction X can be restricted. The central trough 25 has a generally V-shape viewed in a cross section, whereby application of a load from the second principal face 20 (that is, introduction of the second connector) enables the second ridges 21 to be preferably bent to lean toward the central trough, to more preferably elastically deform the second ridges in the width direction X.

Moreover, the central trough 25 is more preferably formed to have a sufficiently great depth, viewed in a cross section, so that the second ridges 21 can be preferably bent in the state of application of a compressive load. In other words, the central trough 25 is preferably a trough with a sufficient depth, formed between the two second ridges 21 independent from each other, rather than a recess formed in each second ridge. Specifically, the depth D of the central trough 25, viewed in a cross section, may be equivalent to or more than the heights H1 of the second ridges 21 adjacent to the central trough. As used herein, "depth of central trough" means a dimension between each vertex 21*c* of the second ridges 21 adjacent to the central trough 25 and the bottom 25*a* of the central trough, viewed in a cross section (see FIG. 4). Moreover, "height of second ridge" means a dimension between the outer ridge start point 21*d* of the second ridge 21 and the vertex 21*c* of the second ridge. For example, the depth D of the central trough 25 may be 50% to 120%, 60% to 115%, or 70% to 110% of the height H1 of each second ridges 21 adjacent to the central trough although the depth D varies depending on the thickness, size, and the like of the sealing element 100.

As illustrated in FIG. 5A, in the second principal face 20 including the central trough 25, each of the plurality of second ridges 21 is bent toward the center, whereby the two second ridges adjacent to each other across the central trough are bent toward the central trough to approach each other. In one embodiment, in accordance with such a structure, even in the case of applying a pressure from any one side of the raised region in the width direction X (that is, the inner or outer side of the connector) to the sealing element 100, water-stop performance can be preferably secured by the second ridge 21 in the other side. This is because in a case in which, for example, water or the like enters a portion, from the one side, across the second ridge 21 located in the concerned side, application of a water pressure to the second ridge located in the other side allows a pressure to be applied in the direction of pressing the concerned second ridge against the second connector 300, whereby the concerned second ridge can come into more intimate contact with the second connector.

Moreover, the second ridges 21 come into intimate contact with the second connector 300 while being bent, whereby not only the vertexes of the second ridges but also the side face regions of the second ridges can abut with the second connector 200. Therefore, a wider abutment region between each second ridges 21 and the second connector 300 can be secured in the sealing element 100 of the present disclosure. Further, the first ridges 11 are bent in the width direction X in conjunction with the second ridges 21, whereby an abutment region between each first ridge and the first connector 200 can also be further enlarged. As a result, the sealing element 100 and the first/second connector 200, 300 can come into intimate contact with each other in a wider region, and therefore, the sealing property of the sealing element can be further improved. Accordingly, the more preferred sealing element in which both of a reduction in force of introducing a connector and the preferred sealing property are achieved can be provided in accordance with the present disclosure.

Figure 5B:
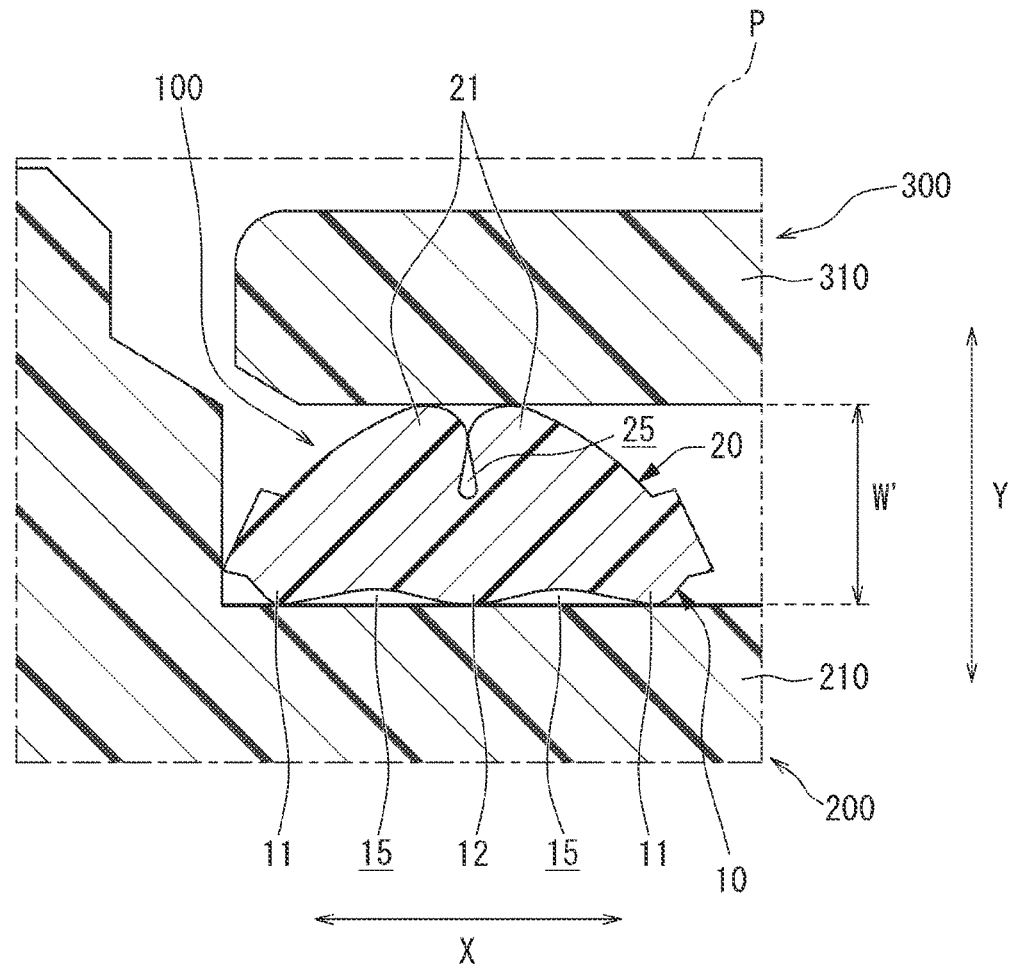
FIG. 5B is a cross section enlarged view schematically illustrating another embodiment of a sealing element located between a first connector and a second connector.

FIG. 5B is a cross sectional view schematically illustrating an aspect in which a spacing W between the first connector 200 and the second connector 300 is less than that in FIG. 5A. In other words, FIG. 5B illustrates an aspect in which a compressive load that is larger than that in FIG. 5A is imposed. As illustrated in FIG. 5B, the spacing W between the first connector 200 and the second connector 300 may be smaller depending on a dimensional tolerance between the first connector and the second connector. In a conventional sealing element 100, a decrease in such a spacing W enables application of a large compressive load to the sealing element in an operation of mating a connector, and an increase in repulsive force acting from the sealing element onto a first connector 200 and/or a second connector 300. This repulsive force can result in an increase in force required in the mating operation and results in application of an excessive load on the first connector 200 and the second connector 300, causing deformation and/or breakage.

In the sealing element 100 of the present disclosure, the spacing W between the first/second connectors is small as illustrated in FIG. 5B, and application of a larger load enables the second ridges 21 to be bent to further lean toward the center. It can be understood that this means that an increase in compressive load results in a further increase in the elastic deformation of the sealing element 100 in the width direction X. As described above, even when a larger load is applied from the thickness direction Y to the sealing element 100 due to a dimensional tolerance between the connectors, and/or the like, the sealing element of the present disclosure is preferably elastically deformed in the width direction X, whereby the elastic deformation of the sealing element in the thickness direction Y can be suppressed. Accordingly, an excessive increase in repulsive force acting in the thickness direction Y can be preferably suppressed in accordance with the structure of the sealing element 100 of the present disclosure.

In one embodiment, the second ridges 21 adjacent to each other across the central trough 25 may be bendable toward the center to abut on each other in a state in which a compressive load is applied to the second ridges (see FIG. 5B). For example, the second ridges 21 adjacent to each other may be formed so that in a state in which the second ridges are bent toward the center to approach each other by a compressive load, the second ridges are further bent to block the central trough 25 by a pressure applied from the outside to the sealing element, whereby the second ridges can abut on each other. For example, the second ridges 21 adjacent to each other may be further bent to be able to abut on each other in a case in which a load is further applied in the thickness direction Y of the sealing element 100, and/or in a case in which a pressure is applied from the end side in the width direction X of the raised region (that is, the inner and/or outer sides of the connector) to the sealing element. The second ridges 21 adjacent to each other abut on each other, whereby such two second ridges come into intimate contact with the second connector 300 while supporting each other, and therefore, a sealing property offered by the sealing element 100 can be further improved.

The plurality of first ridges 11 that are raised toward the first connector 100 may be raised at different heights, respectively. For example, in the plurality of first ridges 11 adjacent to each other, the first ridge located in a side farther from the center of the raised region 110, viewed in a cross section, may be raised at a greater height than the first ridge located in a side closer to the center. In a certain preferred embodiment, the central ridge 12 that is raised at a height different from the heights of the first ridges 11 is further included between any two first ridges adjacent to each other, among the plurality of first ridges. The central ridge 12 is located in the center of the first principal face 10. The central ridge 12 is preferably raised so that the height H2 of central ridge is less than the heights of the plurality of first ridges 11 (see FIG. 4). In other words, in the first principal face 10, the central ridge 12 may be raised so that the height H2 of the central ridge located in the center, viewed in a cross section, is the lowest, and the heights H3 of the plurality of first ridges 11 located outward from the central ridge are greater than the height H2.

As described above, the central ridge 12 is designed so that the height H2 of the central ridge located in the center of the first principal face 10, viewed in a cross section, is the lowest, whereby the central ridge need not abut on the first connector 200 in a state in which a compressive load is not applied to the sealing element (that is, in a state in which the second connector is not introduced). Application of a compressive load to the sealing element 100 (that is, introduction of the second connector 300) enables the sealing element to be elastically deformed so that the central ridge 12 moves toward the first connector 200. In other words, the application of the compressive load from an area closer to the second principal face 20 by the introduction of the second connector 300 enables the sealing element 100 to be elastically deformed toward a lower part in the figure so that the center in the width direction X of the raised region is depressed toward the first connector 200. The central trough 25 of the second principal face 20 can also be deformed to be depressed toward the first connector 200 in conjunction with such deformation. As a result, the plurality of second ridges 21 located on both sides across the central trough 25 are elastically deformed so as to be pulled toward the central trough, and it becomes easy to bend the second ridges toward the center. In other words, the above-described structure enables the sealing element 100 to be more preferably elastically deformed in the width direction X when the sealing element 100 receives a compressive load. Accordingly, the above-described structure in which the height of the raised portion of a first ridge 11 located at a position closer to the center is lower enables suppression of excessive repulsive force from the sealing element 100, and provision of a sealing element in which force required in an operation of mating a connector can be more preferably reduced.

As illustrated in FIG. 3, the central ridge 12 located in the center of the first principal face 10 and the central trough 25 of the second principal face 20 may be located in sides opposite to each other with respect to the thickness direction Y of the sealing element 100. In other words, the central ridge 12 of the first principal face 10 and the central trough 25 of the second principal face 20 may be located on the same line with respect to the thickness direction Y. For example, the vertex 12*c* of the central ridge and the bottom 25*a* of the central trough may be located on the same imaginary line along the thickness direction Y. More preferably, the vertex 12*c* of the central ridge and the bottom 25*a* of the central trough may be located on a central line A that passes through the center of the raised region 110 and extends along the thickness direction Y, viewed in a cross section.

In a case in which the central ridge 12 and the central trough 25 are positioned as described above, the central portion of the raised region 110 is more preferably easily elastically deformed toward the first connector 200 when a compressive load is applied in the thickness direction Y. Both the ends of the raised region 110 are relatively deformed toward the second connector 300 in conjugation with such elastic deformation. As a result, the second ridges 21 can be enabled to preferably lean toward the center. Further, the central ridge 12 and the central trough 25 are located on the central line A of the raised region 110, viewed in a cross section, whereby both the ends of the raised region can be elastically deformable to be symmetric with respect to the central line A. Therefore, the first/second connectors 200, 300 and the sealing element 100 are more preferably brought into intimate contact with each other in both the ends of the raised region 110, and the repulsive force of the compressed and deformed sealing element can be preferably inhibited from being biased in a local region. Accordingly, the repulsive force of the sealing element 100 is preferably dispersed, and repulsive force can be preferably inhibited from excessively acting on the first connector 200 and/or the second connector 300 abutting on the sealing element. In other words, force required in an operation of mating a connector can be more preferably reduced in accordance with the sealing element 100 of the present disclosure.

The central ridge 12 and the plurality of first ridges 11 may be positioned to be offset in the width direction X of the raised region 110 with respect to the plurality of second ridges 21 located on the second principal face 20 reverse to the central ridge 12 and the plurality of first ridges. More specifically, the vertexes of the plurality of first ridges 11 and the central ridge 12 may be positioned to deviate in the width direction X with respect to the vertexes of the plurality of second ridges 21, viewed in a cross section. In other words, the ridges of the first principal face, including the first ridges 11 and the central ridge 12, and the second ridges 21 need not be located on the same line with respect to the thickness direction Y of the sealing element 100. For example, the ridges of the first principal face, including the first ridges 11 and the central ridge 12, and the second ridges 21 may be placed on the first principal face 10 and the second principal face 20, respectively, so as to alternate, viewed in a cross section.

The ridges of the first principal face, including the first ridges 11 and the central ridge 12, and the second ridges 21 are positioned to be offset against each other, whereby an edge for deflection for elastic deformation in the thickness direction Y exists at a position opposite in the thickness direction of each ridge, viewed in a cross section. Specifically, the ridges of the first principal face, including the first ridges 11 and the central ridge 12, and the second ridge 21 are not located on the same line with respect to the thickness direction Y of the sealing element 100, viewed in a cross section. Therefore, gaps 15 exist on a side opposite to the second ridges 21 between the first connector 200 and the sealing element 100 in a state in which no compressive load is applied. When a compressive load is applied, the ridges abutting on the connectors are pressed, and the sealing element 100 can be deformed so that the gaps 15 between the first connector 200 and the sealing element become smaller.

In a structure in which the ridges of two principal faces reverse to each other are located on the same line with respect to a thickness direction, like a conventional structure, there is a fear that application of a compressive load causes the ridges located on the same line to be elastically deformed so that the ridges are compressed in a thickness direction Y, and therefore, repulsive force acting in the thickness direction Y is excessively increased. In contrast, in the sealing element 100 of the present disclosure, the ridges 11, 12 of the first principal face 10 and the second ridges 21 are positioned to be offset against each other, whereby application of a compressive load enables the sealing element to be deformed so that the sealing element is bent, and therefore, compressive deformation in the thickness direction Y of the ridges is reduced. As a result, excessive repulsive force from the sealing element 100 to the connectors, caused by the compressive deformation of the sealing element, can be preferably suppressed.

As described above, the second ridges 21 adjacent to each other may be bent toward the center in a state in which a compressive load is applied, and the tip portions of the second ridges may be able to abut on each other to support each other. Therefore, it is preferable to position an even number of second ridges 21 on the second principal face 20. For example, two, four, or six second ridges 21 may be formed on the second principal face 20. When a high value is placed on the strengths of the ridges, a lesser number of (for example, two or four) second ridges 21 are preferably positioned on the second principal face 20 so that the cross-sectional area of each ridge becomes larger. In a certain preferred aspect, two second ridges 21 may be placed to form the central trough 25 in the center of the second principal face 20 (see FIG. 3). Alternatively, the second principal face 20 may include four second ridges 21 (see FIG. 6).

Figure 6:
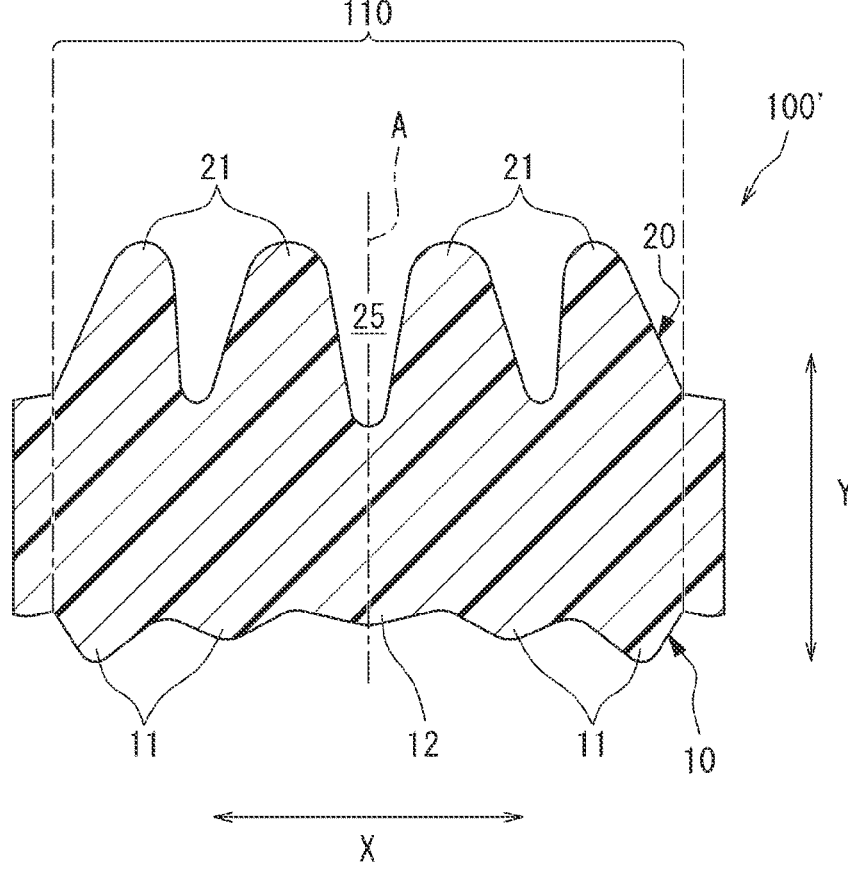
FIG. 6 is a cross sectional view schematically illustrating an alternative example of a sealing element of the present disclosure.

The first ridges 11 more preferably include at least the central ridge 12 and first ridges located on more outer both sides than the second ridges 21, viewed in a cross section. Accordingly, the first principal face 10 preferably includes at least three first ridges 11. In a certain preferred aspect, in contrast to an even number of the second ridges 21, an odd number of ridges 11, 12 are positioned to be offset against each other on the first principal face 10. In other words, the first principal face 10 may include an odd number of ridges including an even number of first ridges 11 and one central ridge 12. In other words, the sealing element 100 of the present disclosure may include an even number of first ridges 11 and an even number of second ridges 21. For example, the sealing element 100 may include two first ridges 11, one central ridge 12 located between the two first ridges, and two second ridges, as illustrated in FIG. 3. Alternatively, as illustrated in FIG. 6, the sealing element 100 may include four first ridges 11, one central ridge 12, and four second ridges 21 so that the first ridges, the central ridge, and the second ridges are positioned to be offset against each other, viewed in a cross section.

The cross-sectional shapes of the first ridges 11 and the second ridges 21 may have mountain shapes of which the width dimensions gradually decrease with approach to the vertexes of the ridges. In particular, each second ridge 21 may have an outer contour in which the slope angles of a sloped face 21*b* closer to the center of the second principal face and an outer sloped face 21*a* opposite to the sloped face closer to the center, viewed in a cross section, are different from each other. In other words, the cross-sectional shape of each second ridges 21 is not symmetrical, and a portion closer to the center and an outer portion in each second ridge may slope at different angles. This means that the cross-sectional shape of each second ridge 21 is line-asymmetrical with respect to an imaginary line B that passes through the vertex of each second ridge and is parallel to the thickness direction Y of the sealing element (see FIG. 3). Specifically, in each second ridge 21, the slope angle of the sloped face 21*b* closer to the center may be greater than the slope angle of the outer sloped face 21*a*. In other words, in the cross-sectional shape of each second ridge 21, the angle of the outer slope may be less than the angle of the slope closer to the center. In this way, in each second ridge 21, an outer portion may more gently slope than a portion closer to the center, viewed in a cross section.

In accordance with such a shape, each second ridge 21 includes a gentle slope in a side into which the second connector 300 is introduced, and therefore interference between the second connector and the sealing element 100 in an operation of introducing the second connector can be reduced. Accordingly, the second connector 300 can be more easily introduced, and force required in an operation of mating a connector can be more preferably reduced.

In contrast, each first ridge 11 may more gently slope in a portion closer to the center than in an outer portion, viewed in a cross section. In other words, each first ridge 11 may have an asymmetric shape, viewed in a cross section. This means that the cross-sectional shape of each first ridge 11 is line-asymmetrical with respect to an imaginary line C that passes through the vertex of each first ridge and is parallel to the thickness direction Y of the sealing element (see FIG. 3). In other words, in each first ridge 11, the slope angle of the sloped face 11*b* closer to the center may be less than the slope angle of the outer sloped face 11*a*. In contrast, the cross sectional shape of the central ridge 12 is line-symmetrical with respect to an imaginary line (corresponding to the central line A in FIG. 3) that passes through the vertex of the central ridge and is parallel to the thickness direction Y of the sealing element.

Commonly, the second connector 300 is introduced into the first connector 200 to which the sealing element 100 is attached. In other words, the second connector 300 is introduced into a portion closer to the second principal face 20 in a state in which a portion closer to the first principal face 10 including the first ridges 11 abuts on the first connector 200. In such a case, each first ridge 11 has a shape in which the outer side of each first ridge more steeply slopes, whereby bending of each first ridge toward the center is suppressed. Therefore, when force is applied to the sealing element along the direction of introducing or removing the second connector 300 (that is, the width direction X of the connector), interference between the first connector 200 and the first ridges 11 abutting on the first connector can be increased to inhibit movement of the sealing element 100 in such an introduction or removal direction. Accordingly, each first ridge 11 has such a cross sectional shape as described above, whereby inhibition of unintentional movement of the sealing element 100 due to an operation of introducing or removing the second connector 300 can be enabled. In other words, the sealing element 100 is preferably retained on the first connector 200 by the first ridges 11, whereby easier introduction or removal of the second connector 300 can be enabled.

In one embodiment, the raised region 110 includes a line-symmetrical portion, viewed in a cross section. For example, the cross-sectional shape of the raised region 110 may be line-symmetrical with respect to the central line A that passes through the center of the sealing element 100 and extends in the thickness direction Y (see FIG. 3). The positioning and form of the first ridges 11 and the second ridges 21 in the raised region 110, viewed in a cross section, may be symmetrical with respect to the central line A. The cross-sectional shape of the raised region 110 is line-symmetrical, whereby horizontally evenly elastic deformation of the sealing element 100 in the raised region 110 in application of a compressive load is further facilitated, and local concentration of repulsive force acting due to the elastic deformation can be preferably inhibited. As used herein, "line-symmetrical" is not necessarily limited to "completely line-symmetrical" but encompasses form and/or positioning that are approximately line-symmetrical.

Figure 4:
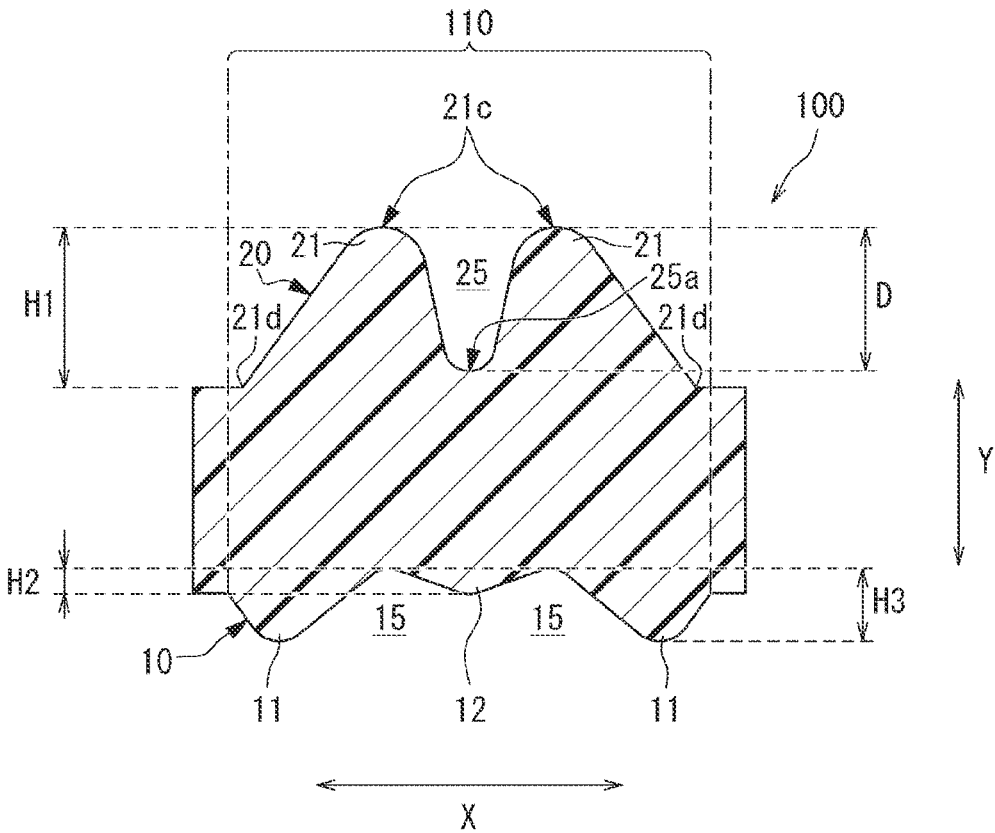
FIG. 4 is a cross sectional view schematically illustrating the cross section of the sealing element, taken along the line I-I of FIG. 1.

In one embodiment, the sealing element 100 including the raised region 110 may be line symmetrical as a whole, viewed in a cross section. In other words, the cross sectional shape of the sealing element 100 may have a shape that is line-symmetrical with respect to the central line A, as illustrated in FIG. 3 or 4.

Figure 7A:
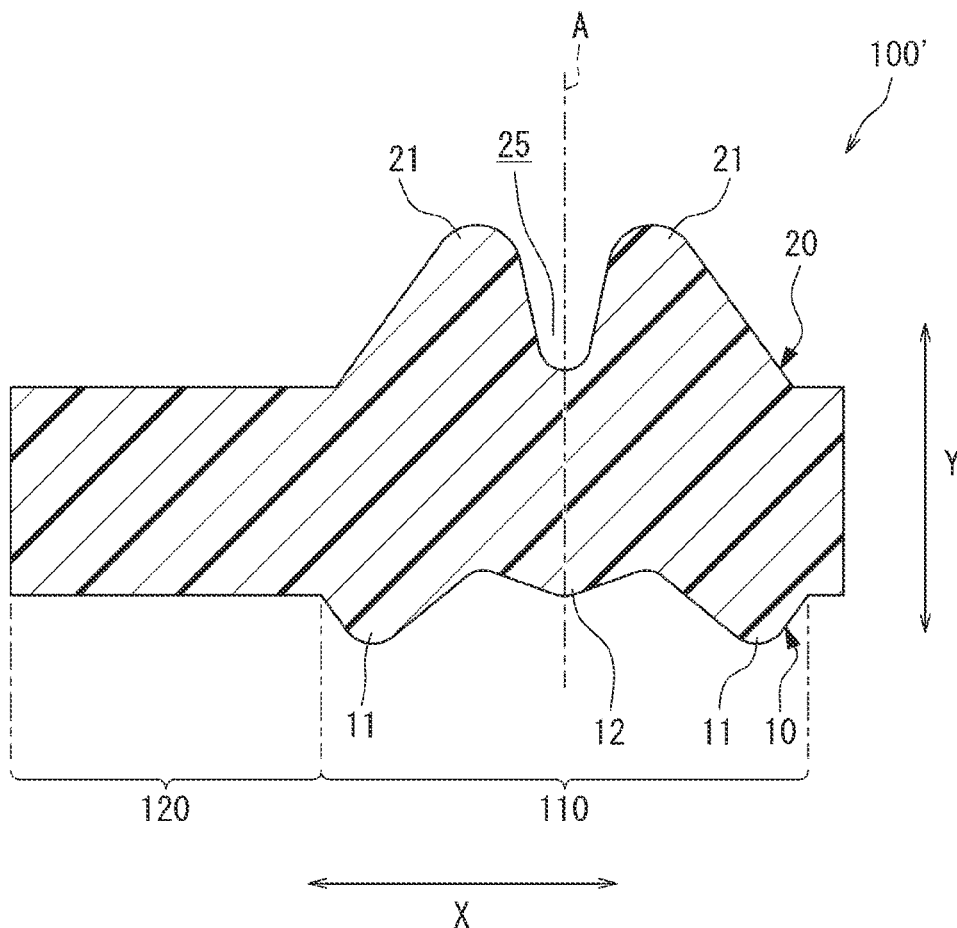
FIG. 7A is a cross sectional view schematically illustrating an alternative example of a sealing element of the present disclosure.
Figure 7B:
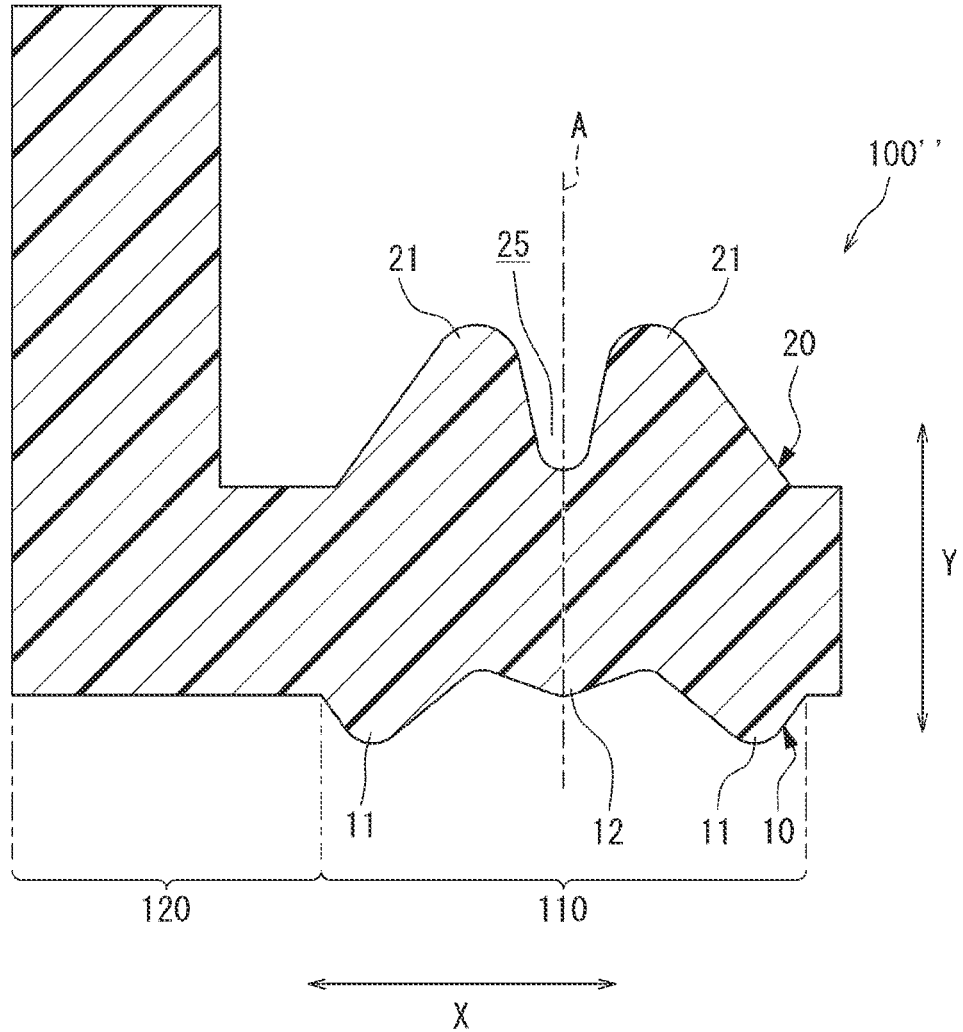
FIG. 7B is a cross sectional view schematically illustrating an alternative example of a sealing element of the present disclosure.

In another embodiment, the sealing element 100 further includes an extension region 120 contiguous to the raised region 110 (see FIGS. 7A and 7B). The extension region 120 may extend from the at least one end of the raised region 110, viewed in a cross section. Such an extension region 120 is a region that does not include a ridge extending from the raised region 110 and can thus also be referred to as "non-raised region", "ridge-free region", and the like. The extension region 120 is included, whereby a region in which the sealing element 100, and the first connector 200 and/or the second connector 300 can come into contact with each other is enlarged, and therefore, it is possible to achieve improvement in sealing property and to more preferably prevent the deviation of the sealing element 100 due to introduction or removal of the connectors. In other words, the sealing element of the present disclosure, including a structure further including the extension region 120 as well as the raised region 110, can be preferred in view of a sealing property, and prevention of the deviation of the sealing element, as well as a reduction in force required in an operation of mating a connector.

The extension region 120 may extend in an area closer to the interiors of the connectors along the shape of a gap between the first connector 200 and the second connector 300. In such a shape, the sealing element 100 including the raised region 110 may be line asymmetrical as a whole. For example, at least a portion of the extension region 120 may extend in a direction different from the direction of the raised region 110. Specifically, at least a portion copy of the extension region 120 may extend in a direction different from the width direction X of the raised region 110. In one embodiment, the extension region 120 includes a generally L-shaped portion along the shape of the gap between the first connector and the second connector, viewed in a cross section (see FIG. 7B). More specifically, the extension region 120 may have a generally L-shape so that the extension region can be located between the first connector and the leading end of the housing of the second connector. In accordance with such a structure, the sealing element 100 can be preferably brought into face contact with the first connector and/or the second connector in the extension region 120. Therefore, the sealing element 100 includes portions that can come into intimate contact with the first connector 200 and/or the second connector 300, in both the raised region 110 and the extension region 120, to be able to achieve a further preferred sealing property.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A sealing element, comprising:
a raised region, including:
a plurality of first ridges on a first principal face;
a plurality of second ridges on a second principal face opposite to the first principal face; and
a central trough formed between two adjacent ones of the plurality of the second ridges and located in a center of the second principal face, at least an outermost first ridge of the first plurality of ridges is offset in a width direction of the sealing element from the plurality of second ridges, wherein the outermost first ridge has a height greater than a height of at least one of a remainder of the plurality of first ridges arranged closer to a center of the first principal face.

2. The sealing element according to claim 1, further comprising a central ridge located in a center of the first principal face and between any two of the plurality of first ridges.

3. The sealing element according to claim 2, wherein the central ridge has a height less than heights of the plurality of first ridges.

4. The sealing element according to claim 3, wherein the central ridge and the central trough are aligned in the width direction of the sealing element.

5. The sealing element according to claim 1, wherein the plurality of second ridges are adapted to deflect toward the central trough in a state in which the plurality of second ridges receive a compressive load in a thickness direction of the sealing element.

6. The sealing element according to claim 5, wherein raised portions of the second ridges adjacent to each other across the central trough area are adapted to deflect into direct contact with one another.

7. The sealing element according to claim 1, wherein the plurality of first ridges comprise an even number of the first ridges and one central ridge on the first principal face, and the plurality of second ridges comprise an even number of the second ridges on the second principal face.

8. The sealing element according to claim 1, wherein vertexes of the plurality of first ridges and vertexes of the plurality of second ridges are offset from each other in the width direction of the sealing element.

9. The sealing element according to claim 1, wherein the central trough is tapered toward a bottom thereof such that a width of the central trough is gradually reduced.

10. The sealing element according to claim 1, wherein the raised region comprises a line-symmetric portion.

11. The sealing element according to claim 1, wherein at least one of the plurality of first ridges or the plurality of second ridges are asymmetric in the width direction of the sealing element.

12. The sealing element according to claim 1, wherein a slope angle of a sloped face of a side of each of the second ridges farther from the center of the second principal face is less than a slope angle of a sloped face of a side closer to the center, the slope angle defined relative to the width direction of the sealing element.

13. The sealing element according to claim 1, further comprising an extension region contiguous to the raised region.

14. The sealing element according to claim 13, wherein at least a portion of the extension region extends in a direction distinct from a direction of the raised region.

15. The sealing element according to claim 1, wherein a cross sectional shape of the sealing element comprising the raised region is asymmetric relative to the center of the second principal face in the width direction of the sealing element.

16. A connector assembly, comprising:

a first connector;

a second connector mateable to the first connector; and a sealing element arranged between the first connector and the second connector, the sealing element including:

a raised region, having:

a plurality of first ridges on a first principal face;

a plurality of second ridges on a second principal face opposite to the first principal face; and a central trough formed between two adjacent ones of the plurality of the second ridges, at least an outermost first ridge of the first plurality of ridges is offset in a width direction of the sealing element from the plurality of second ridges, wherein, with the first connector mated to the second connector, raised portions of the second ridges adjacent to each other across the central trough area are deflected into direct contact with one another.

17. The connector assembling according to claim 16, further comprising a central ridge located in a center of the first principal face and between any two of the plurality of first ridges, the central ridge has a height less than heights of the plurality of first ridges.

18. The connector assembling according to claim 16, wherein at least one of the plurality of first ridges or the plurality of second ridges are asymmetric in the width direction of the sealing element.

19. The connector assembling according to claim 18, wherein a slope angle of a sloped face of a side of each of the second ridges farther from the center of of the second principal face is less than a slope angle of a sloped face of a side closer to the center, the slope angle defined relative to the width direction of the sealing element.

20. A sealing element, comprising:

a raised region, including:

a plurality of first ridges on a first principal face;

a plurality of second ridges on a second principal face opposite to the first principal face, a slope angle of a sloped face of a side of each of the second ridges farther from the center of the second principal face is less than a slope angle of a sloped face of a side closer to the center, the slope angle defined relative to a width direction of the sealing element; and a central trough formed between two adjacent ones of the plurality of the second ridges and located in a center of the second principal face, at least an outermost first ridge of the first plurality of ridges is offset in the width direction of the sealing element from the plurality of second ridges.

*  *  *  *  *